Oct. 10, 1950 — R. G. AREY — 2,524,950
AUTOMOBILE TIRE CHAIN AND METHOD OF APPLYING THE SAME
Filed Oct. 29, 1947 — 4 Sheets-Sheet 1

Inventor:
Ralph G. Arey
by James R. Hodder
Attorney

Oct. 10, 1950     R. G. AREY     2,524,950
AUTOMOBILE TIRE CHAIN AND METHOD OF APPLYING THE SAME
Filed Oct. 29, 1947     4 Sheets-Sheet 3

Inventor:
Ralph G. Arey
by James R. Hodder
Attorney

Oct. 10, 1950          R. G. AREY          2,524,950
AUTOMOBILE TIRE CHAIN AND METHOD OF APPLYING THE SAME
Filed Oct. 29, 1947          4 Sheets-Sheet 4
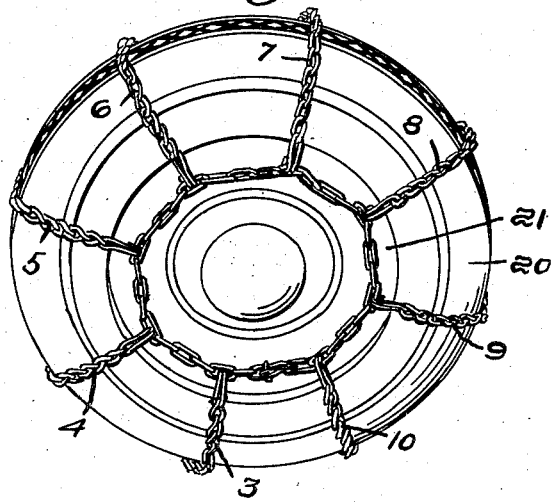
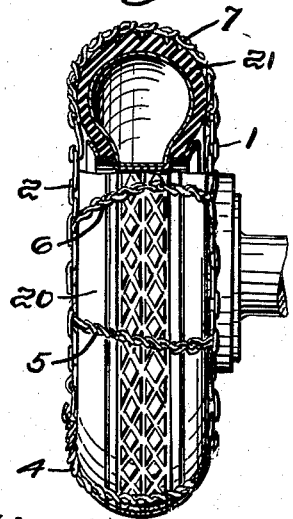
Inventor:
Ralph G. Arey
by James R. Hodder
Attorney Patented Oct. 10, 1950

2,524,950

UNITED STATES PATENT OFFICE 2,524,950

AUTOMOBILE TIRE CHAIN AND METHOD OF APPLYING THE SAME

Ralph G. Arey, Lynn, Mass.

Application October 29, 1947, Serial No. 782,792

3 Claims. (Cl. 152—213)

My present invention is a novel and improved construction of traction or anti-skid tire chains for use on automobile wheels, and includes a novel method of attaching and detaching the same from the wheels.

Heretofore it has been customary, where a complete chain around the wheel is to be applied, either to jack up the car in order to apply the chains properly or to lay the chains out flat and then roll the car wheels over the same. A similar difficulty is present when removing such set of chains from a wheel, and the time, labor, and skill involved has been so objectionable that the ordinary driver does not put on chains except when compelled so to do by extreme conditions and circumstances. Accordingly, many people use single links which can be attached at different points around the wheels without jacking up the car or spreading out the chains and rolling the wheels thereover.

It is well known that a full set of complete chains around the wheel is much preferable to single links, but the single links have the advantage of being capable of attachment to the wheels with the wheel bearing on the ground.

My present invention enables a full complete set of chains to be attached to a wheel without lifting the wheel by jacking it up and without rolling the auto thereover, thus combining to a large degree the advantages of attaching a single link, or links, together with the desired and preferred equipment of the wheels with a full and complete traction chain.

In carrying out my invention I have devised a novel construction of side links or members, together with a novel combination of cross-links or anti-skid elements so constructed and arranged whereby the entire set of complete traction chains or elements can be quickly and easily fitted about a wheel without jacking up the same and without rolling it thereover, and can be as readily removed.

My invention contemplates the construction of side elements, preferably chains, which are of uneven length and together with the cross-members or links are so proportioned as to permit the fitting of the anti-skid members about the base of an auto wheel while the latter is in contact with the ground, and thereupon hooking and engaging the inner longer side member which can be thus hooked and locked in a convenient and quickly accessible position. Thereupon by leaving the shorter side member unhooked, I lift and adjust the cross-links and the attached outer portion of the longer element up over the wheel, and thereafter with the cross-links thus adjusted about the periphery of the wheel and tire and with the shorter side member on the outer face of the wheel I can quickly and easily attach, hook, and lock the adjacent ends of the shorter side member, thus completing the application of the full tire chains to the wheel.

A further feature consists in the advantage of interchangeability of the cross-links when worn, because of the differential in the wearing part caused by the longer and shorter side members. Thus a worn link can be reversed and an unworn part positioned in the line of tread.

Thus I am enabled to hook and engage the abutting ends of both the inner side element and the outer side element while within full view and reach of the operator. The respective lengths of the shorter and longer side elements, as well as the lengths and position of the cross-members, are of special and critical importance to not only permit but to facilitate the feeding of the set of anti-skid chains about the wheel. Furthermore, the spacing of the cross-members are important to provide a sufficient area or distance at each side of the point of contact of the wheel and tire with the ground so as to allow for proper adjustment and attachment of the outer side chain.

Further features, advantages, and novel combinations will be hereinafter more fully pointed out and claimed.

Referring to the drawings illustrating a preferred embodiment of my present invention and the method of attaching the same:

Fig. 7 shows the completed application of my improved traction chains on a wheel and tire;

Fig. 8 is a corresponding view partly in cross-section;

Figure 1:
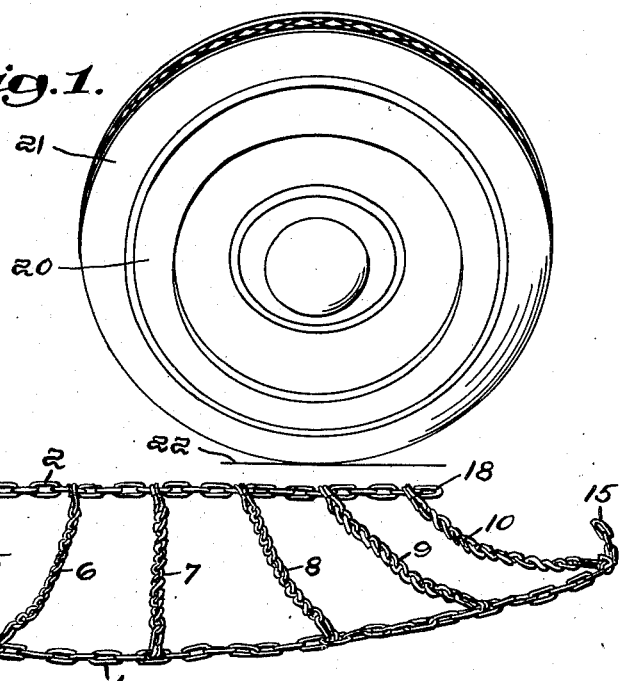
Fig. 1 is a diagrammatic view of an automobile wheel and tire with my novel construction of anti-skid chains shown in plan view.

Figs. 9, 10, and 11 are detailed views, respectively, of a suitable design of hook and locking element for uniting the abutting ends of the side chains.

Referring to the drawings, my novel construction comprises side chains or elements 1 and 2 and a series of cross-links or traction members 3, 4, 5, 6, 7, 8, 9, and 10. This arrangement and construction is preferably for a standard size automobile tire but a different number of cross-chains can, of course, be utilized and particularly for varying sized wheels with which the anti-skid devices are to be applied. For the usual rubber-tired automobile wheel the arrangement of eight cross-links gives ample space for the fitting of my novel anti-skid devices to the wheel, leaving free space each side of a portion of the wheel contacting with the ground, which thus facilitates the novel manner in which I apply my chains to the wheel.

I have shown the side chain 1 as considerably longer than the length of the cooperating side chain 2, and the cross-links are in substantially equally spaced attaching position on each of these side chains and, therefore, the cross-links extend somewhat diagonally and at an increasing angle toward each end. A desirable proportion between the longer side frame 1—which is eventually to be fitted over the top of the wheel and on the inner or axle side—is twice the length of the shorter or outer side member 2; also the length of the outer chain 1, which must be less than the circumference of the wheel, is substantially equal to the diameter of the wheel plus the thickness of the tire, which thus gives sufficient length and flexibility to fit the side member 1 with the cross-links attached over the perimeter of the wheel while the wheel is resting on the ground.

Any suitable connecting means, catches, clasps, hooks or the like can be utilized to connect the ends of the side chains. As here shown, I provide a hook 12 at one end of the side chain 1 adapted to hook into a link 15 at the opposite end; and, similarly, a hook 16 at one end of the shorter side chain 2 to fit into a link 18. Details of this connecting hook construction will be explained further and are illustrated in detail in Fig. 9.

Figure 2:
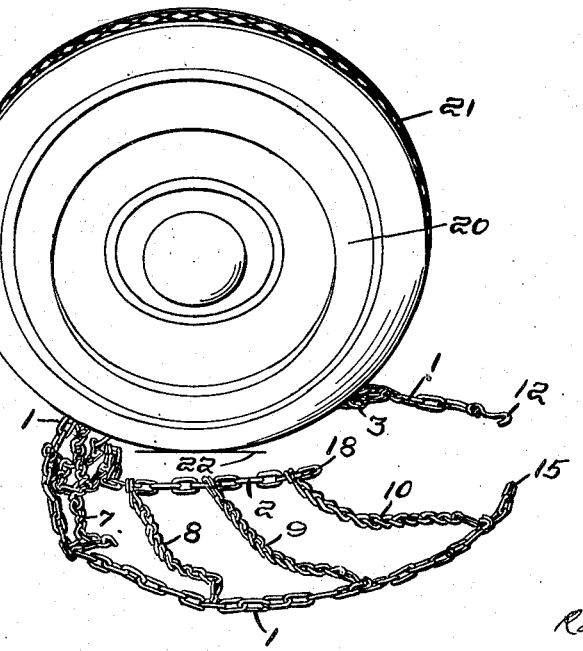
Fig. 2 is a view showing the fitting of the chains about the wheel while the latter is in contact with the ground.

An automobile wheel 20 is shown in diagrammatic form with a tire 21 thereon, and with the wheel resting on the ground as indicated at 22. In order to apply my novel anti-skid chains to such a wheel, both the chains and wheels being of suitable proportions as above explained, I lay the chains spread out as indicated in Fig. 1 and adjacent the outer face of the wheel and tire. Thereupon, I slip, slide, pull, or adjust the entire chain 1 with its hook 12 around the base of the wheel with my anti-skid chains resting on the ground, as indicated in Fig. 2, and thereupon engage the hook 12 and link 15, thus uniting the entire side chain 1, meanwhile leaving the shorter side chain 2 unattached.

Thereupon, with the chain still resting on the ground, I draw back the entire side chain 1, which has been fitted around the inside of the wheel until engagement of the hook 12 and link 15 are approximately in the middle portion of the bottom of the wheel on the inside. This is readily accomplished as the two ends of the entire side chain 1 are united. The hooking and locking of 12 and 15 are thus accomplished in a convenient position and in full view before the retrograde movement of the chain is effected to draw the hooked end on the inner side of the wheel.

Figure 3:
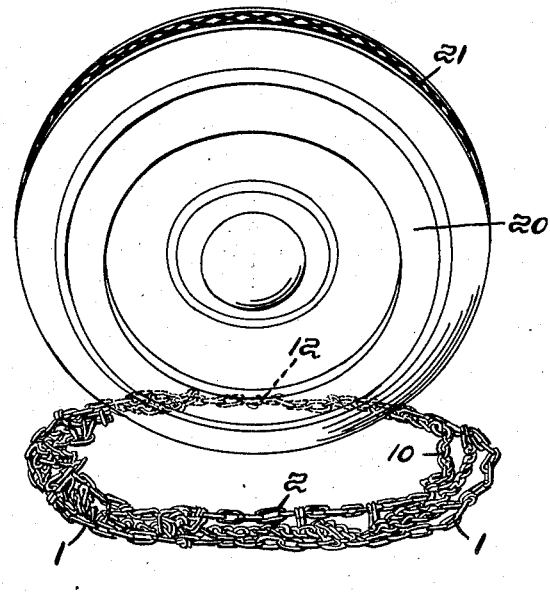
Fig. 3 shows a progressive operation wherein the longer side element after being hooked and locked is slid slightly around the wheel, leaving the mass of cross-links and the shorter side element in front of the wheel.
Figure 4:
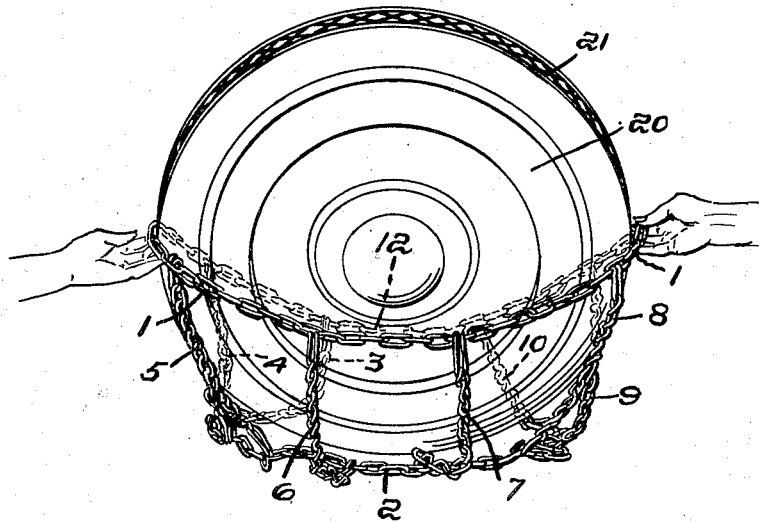
Fig. 4 shows the progressive action of raising the hooked and longer side element upwardly to fit the same over the top of the wheel.
Figure 5:
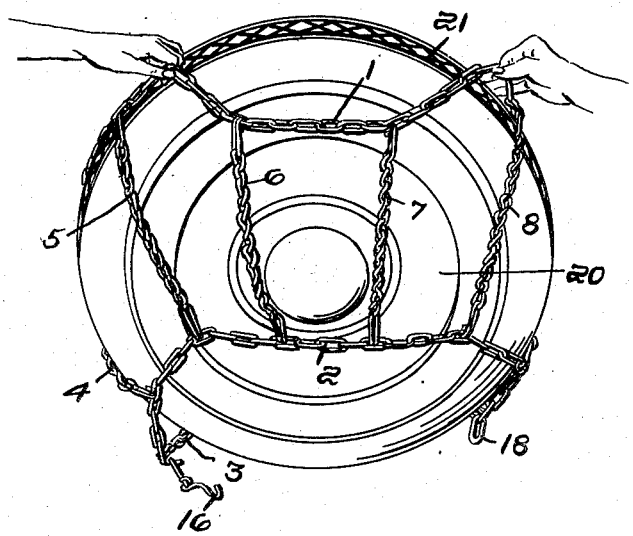
Fig. 5 illustrates a further progressive movement over the top of the wheel.
Figure 6:
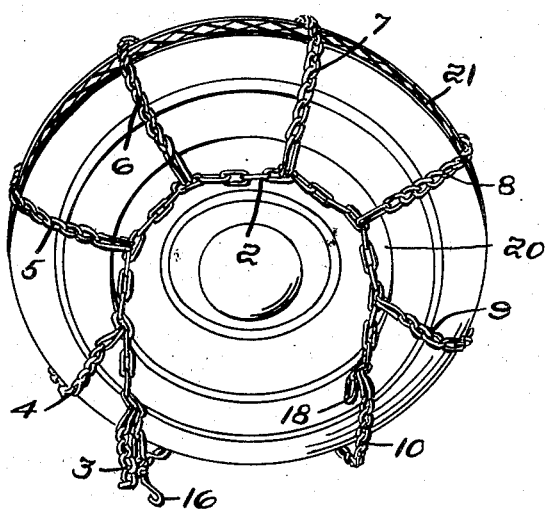
Fig. 6 illustrates the same in complete position ready for the attachment of the abutting ends of the shorter side element.

The chain and wheel are now in approximately the position shown in Fig. 3. Thereafter, the operator grasps the diametrically opposite ends of the united side element 1 and lifts the same up over the tire as shown in Fig. 4, the length of the side chain 1 being the diameter of the tire and wheel plus the cross-sectional thickness of the tire facilitating this adjustment and lifting of the hooked side element 1 upwardly and over the top of the tire, the shorter element 2 being unhooked and thus permitting the longer chain to be lifted over the top of the tire and in position as shown in Fig. 6. Thereupon, the hook 16 and link 18 of the shorter side member 2 can be easily and readily engaged and locked, being in full view and in convenient position of the operator, the wheel still resting on the ground 22 and the cross-links 9 and 10 being suitably spaced.

As shown in Figs. 9, 10, and 11, a suitable catch and lock for the hooks 12 and 15 are illustrated. Thus, for example, the hook 12 could be slid thru the end link 15 and doubled backwardly, and thereupon a sliding ring 25 on the end link 26 of the opposite end of the hook end of the chain 1 slid under the hook, and thus held up in locked position, or any other suitable catch and locking arrangement could be provided.

The fitting of my anti-skid chain about the wheel and tire thus requires but a few moments, enables the hook of each side chain to be effected in full view and in convenient reach of the operator without the necessity of reaching over the wheel or jacking up the same, or rolling the car.

The removal of my anti-skid chain is accomplished with equal facility, the engaging ends of the shorter side member 2 being simply unlocked and the top cross-members utilized to pull the top portion of the inner and longer side chain up over the top of the rim of the wheel and tire and the same is then dropped to the ground. If the hook is within reach of the longer chain 1, it is disengaged; and if not within reach, the chain is manipulated or slid around the bottom of the wheel until the hook comes within view and reach of the operator; whereupon it is disengaged and the entire chain removed.

The cross-chains, it will be noted, are of sufficient length so that only a portion—about one-third—are actually across the tread surface of the tire and, hence, are subject to wear and, if desired, a worn cross-link can be disengaged from the side chains and reversed, thus bringing an unused portion of the cross-chain into tread-engaging position, thereby doubling the life of the cross-chains.

A further advantage of my improved construction is that I actually save substantially twenty per cent of metal in the entire assembly. In addition to this saving is the utilization of the cross-chains at least twice, thus again saving metal or the material of which the cross-chains are made.

While I have illustrated a typical conventional link-chain construction for both the side members 1 and 2 and the cross-links, it will be appreciated that I can employ other forms or materials for either the side members or the cross-links. Thus a wire rope could be used for the side members, and rubber, plastic, or other material for the cross-links.

It will be appreciated that the cross-links engage the tread dissymmetrically, the angle or diagonal line of the cross-members increasing from the center portion of the side chains toward each end. Thus an additional traction feature is secured as the diagonal links tend to prevent side skidding.

My novel and attractive traction devices when attached around a wheel will work freely around the periphery of the wheel tire during use, as is desirable.

I claim:

1. A traction device of the kind described for rubber-tired automobile wheels, having a pair of side members of different lengths united by a plurality of cross-members, in non-parallel relation, the longer of said side members being substantially equal in length to the diameter of the wheel and tire plus the thickness of the tire, the shorter side member being approximately one-half the length of the longer side member, whereby the cross-links uniting the side members extend at divergent angles and the spacing of said cross-links on the shorter side member is approximately one-half the spacing of the cross-links where connected to the longer side member.

2. The improved method of assembling traction devices to a wheel, while said wheel is resting on the ground, which consists in providing a traction device with side elements of different lengths united by a series of cross-members, said side members being disconnected, thereupon fitting one end of the longer side member around the inner surface of the wheel resting on the ground, and uniting the abutting ends of said longer side member, thereupon lifting said side member over the outer face of the wheel and beyond the top of said wheel, whereby said connected inner side member is fitted around the wheel axle and on the inner surface, and thereupon uniting the ends of the shorter side member on the outer face of the wheel, thus completing the assembly.

3. The improved method of applying traction devices to an automobile wheel and removing the same therefrom, said traction device comprising a pair of side elements of different length united by a plurality of cross-members, fitting the longer of said side members around the bottom of the wheel, joining the ends, and lifting it up over the top of the wheel to adjust the said side member on the inner surface with attached cross-members on the top of the tire, and thereupon joining and uniting the ends of the shorter side element on the outer side of the wheel, and removing said traction device by first disconnecting the ends of the shorter side element and thereupon pulling the inner longer side member over the top of the wheel, and thereafter disconnecting the ends of the longer side element.

RALPH G. AREY.

REFERENCES CITED

The following references are of record in the file of this patent:

UNITED STATES PATENTS

| Number | Name | Date |
|--------|------|------|
| 768,495 | Weed | Aug. 23, 1904 |
| 1,627,555 | Gause | May 10, 1927 |
| 1,818,919 | Lynch | Aug. 11, 1931 |
| 1,935,035 | Levi | Nov. 14, 1933 |
| 2,222,393 | Benjamin | Nov. 19, 1940 |